Figure 1:
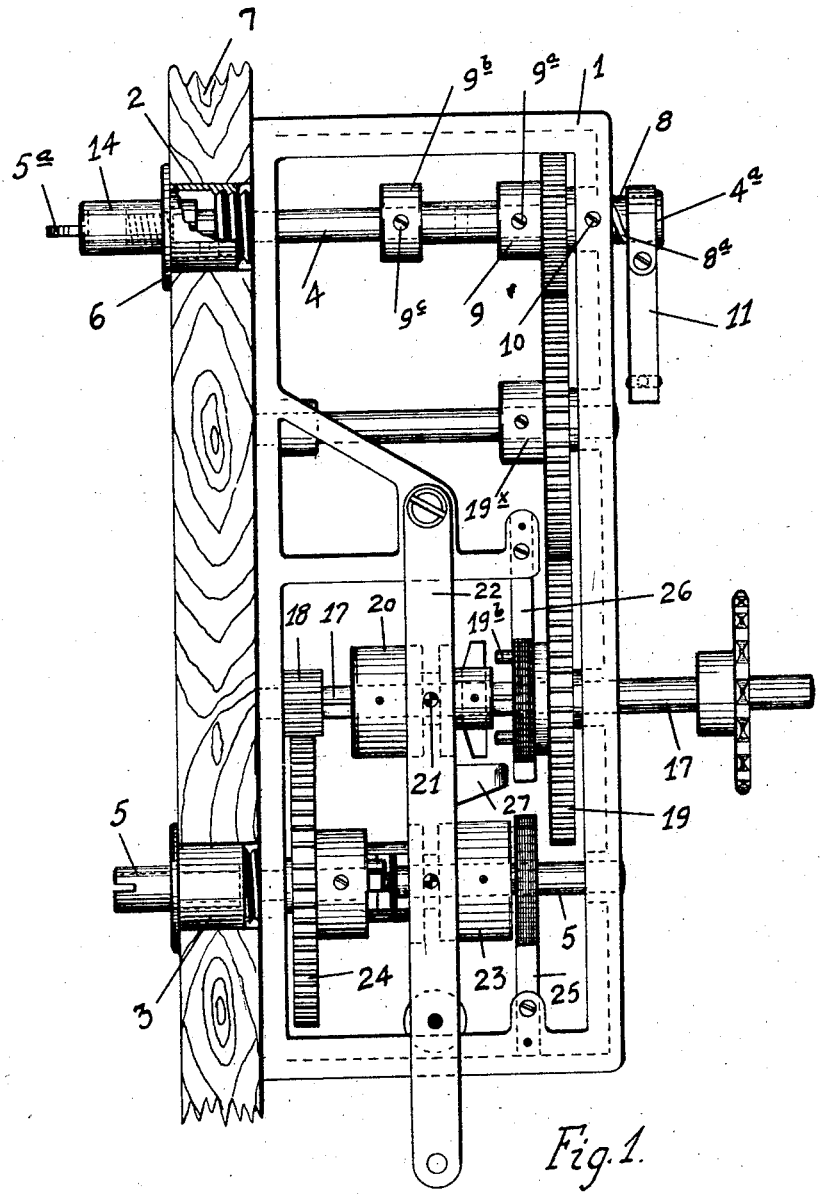

Nov. 2, 1926. 1,605,303
C. UEBELMESSER
TRANSMISSION MECHANISM FOR RECORD CONTROLLED MUSICAL INSTRUMENTS
Filed April 21, 1921 2 Sheets-Sheet 1

INVENTOR
Charles Uebelmesser

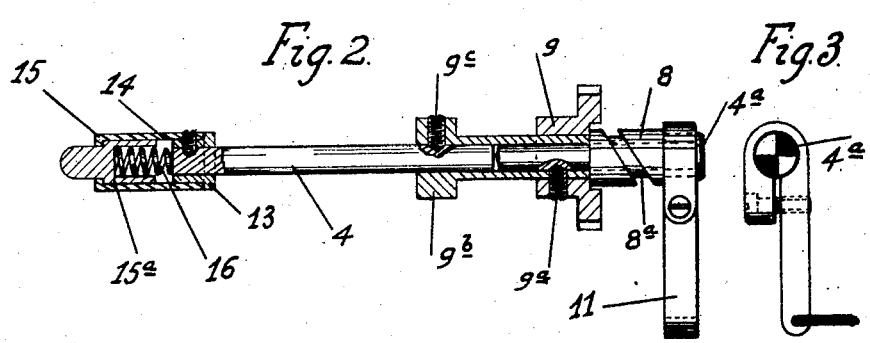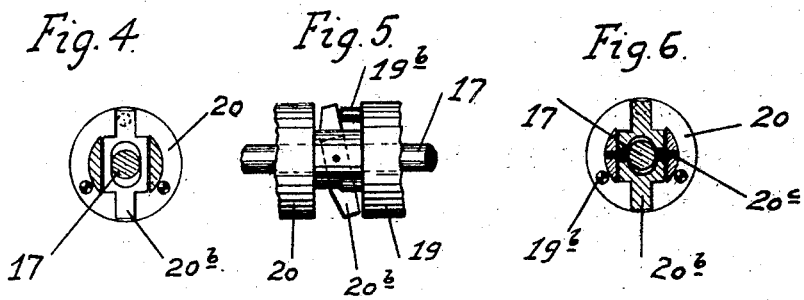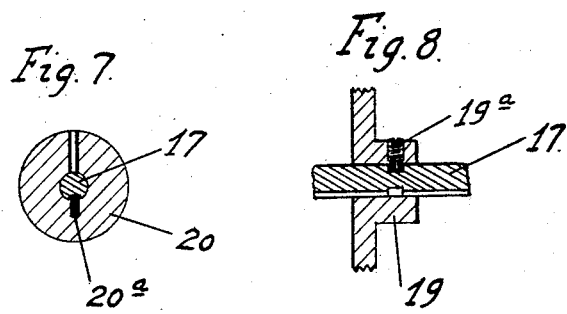

Patented Nov. 2, 1926.

1,605,303

UNITED STATES PATENT OFFICE.

CHARLES UEBELMESSER, OF NEW YORK, N. Y., ASSIGNOR TO WELTE-MIGNON CORPORATION, OF NEW YORK, N. Y., A CORPORATION OF NEW YORK.

TRANSMISSION MECHANISM FOR RECORD-CONTROLLED MUSICAL INSTRUMENTS.

Application filed April 21, 1921. Serial No. 463,376.

One of the important purposes of the invention is to provide an improved means for securing the winding and rewinding mechanism in position in the instrument.

Another of the important purposes of the invention is to provide an improved winding and rewinding mechanism by so constructing the means for applying power to the rewind shaft and to the take up shaft alternately that a positive connection is unfailingly made whenever the gear shift is operated, thereby overcoming difficulties which have been experienced in record controlled musical instruments, particularly of that type in which the shift mechanism is operated under control of the record.

A further important purpose of the invention is to provide an improved connection between the note sheet and one of its operating shafts, which will unfailingly assure a locking engagement between the shaft and adjacent roll whenever power is applied to either and also assure lateral movement of the roll with the shaft whenever the latter is moved longitudinally to bring about registration of the perforations in the roll with the corresponding tracker ducts.

These objects, and others which will hereinafter be seen, are secured in the construction illustrated in the accompanying drawings, in which:—

Figure 1 is a front elevation of the complete device, mounted in the instrument, showing some of the parts in section, Figure 2 is a detail view, mainly in section of the rewinding shaft and the parts applied thereto, Figure 3 is an end view of the rewinding shaft and a side elevation of the lever which is operated to move the shaft endwise while the latter is rotating, Figure 4 is a detail view partly in section and partly in elevation of the driving member of a clutch, Figure 5 is a side elevation of one clutch, Figure 6 is a detail view of a driving clutch member with the locking element thereof in section, Figure 7 is a detail view in cross section showing the connection of the driving clutch member with the shaft upon which it is slidably mounted, Figure 8 is a detail view in cross section of one of the driven clutch members showing the manner of its connection to its shaft.

All the elements of the transmission mechanism are mounted in a main frame, 1, one of whose sides is provided with hollow bosses 2 and 3 which project therefrom and serve as elements of a means of very simple and practicable nature for securing the frame to an appropriate part of the instrument, (as an end wall 7 of the spool box, for example,) and also as bearings for the contiguous ends of the rewinding shaft 4 and take up shaft 5, respectively. These bosses extend loosely through openings in the wall 7 and are externally threaded. Internally threaded cup-nuts 6 having flanged outer ends are screwed upon the outer surface of the bosses and closely fit the openings in the wall 7, and when screwed tight, with their flanges against the surface of said wall, serve in conjunction with the bosses to secure the entire transmission mechanism in position in the instrument.

This transmission comprises as is usual a main or operating shaft 17, and appropriate gearing between the same and the rewinding shaft 4 and take up shaft 5, said gearing including clutch mechanism operative to cause the power to be applied to the shafts alternately, that is to be applied to the take up shaft 5 and to allow the rewinding shaft to run free when the music is being played, and to be applied to the rewinding shaft 4 and allow the take up shaft to run free in the rerolling of the note sheet at the end of the playing operation. The gearing which I prefer to employ, includes a pinion 18 fixed on the shaft 17 and a gear 19 loose on said shaft and provided with a pin 19ª which traverses a channel 19ᶜ in said shaft, a gear 24 loose on the take up shaft 5 and engaged with the pinion 18; a gear 9 operatively related to the shaft 4 and rotative therewith and a gear 19ˣ mounted on a countershaft 19′ and transmitting rotative motion from the gear 19 to the gear 9 and hence to the rewinding shaft 4. The loose gears 19 and 24 are alternately fixed to their respective shafts 17 and 5 by clutch mechanism which as here shown embody complementary members operatively related to the drive shaft 17 and gear 19 to cause power to be applied to the rewind shaft and complementary members operatively related to the gear 24 and take up shaft 5 to cause power to be applied to the latter shaft; and the driving members (as 20 and 23)

of the clutches are slidable upon their shafts into and out of engagement with their complementary driven members, the members 20 and 23 being shown as provided with projections or keys 20$^a$ engaging recesses or keyways 17$^a$ in the shafts 17 and 5, respectively. Sliding movement of the members 20 and 23 upon their respective shafts is effected by an actuating lever 22, which may be operated manually or under control of the record as usual, and is so correlated with the driving clutch members that when it is swung in one direction one driving member is engaged with its driven member and the other driving member is disengaged from its driven member, and when swung in the opposite direction the latter driving member is engaged with its driven member and the first mentioned driving member is disengaged from its driven member. To permit this operation, and also to permit the driving members to rotate constantly with their respective shafts, the lever 22 is provided with projections 21 which extend into circumferential grooves in the driving members. Of course, there is a neutral position, as usual, in which neither clutch is engaged with its complementary member, this position being desirable when the music roll is being inserted and connected to the take up roll, as will be understood.

The two members of each clutch have their confronting surfaces provided with coacting locking elements of a special nature, particularly designed unfailingly to secure a positive locking of the two members together by relative movement of the members toward each other and which locking engagement will at the same time be such that the two members are always free to be separated by force applied to move them, relatively, away from each other. For the purposes stated, one member of each clutch has its end which is presented toward the complementary clutch member provided with a locking element 20$^b$ which extends diametrically with relation to the confronting surface of the latter clutch member and is pivoted between its ends; and said confronting surface (of the complementary clutch member) has projecting portions, as separated pins 19$^b$, relatively arranged to provide separated spaces to receive the locking element 20$^b$ when the two clutch members have been juxtaposed. These projecting portions 19$^b$, moreover, are so arranged with relation to each other and to the ends of the locking element 20$^b$, that one of the spaces between contiguous projections will be in line with one end of the locking element 20$^b$, to receive the same, and another of the projections will be in position to engage the other end of said element, whenever it happens that the clutch members are being brought together in a position such that an obstructed passageway for the whole locking element 20$^b$ is not afforded between the projections. In such case, one or another of the projections 19$^b$ will engage the contiguous end of the locking element 20$^b$ whereupon further relative movement of the clutch members toward each other will cause the pressure thereby imposed on the restrained end of the locking element to force the opposite, unrestrained, end of said element at a speed greater than that of the member upon which it is pivoted into the space adjacent thereto, and thereby instantaneously into locking engagement with the contiguous projection. Thus a locking engagement between the clutch members will be instantaneously effected whenever said members are brought into juxtaposition, and regardless of whether or not the relative positions of the two members is such while they are being brought together that the pivoted locking element on one member is in full alinement with the spaces between projections at opposite sides of the other member. To make the locking of the parts together more certain under all conditions, I prefer to employ pins, as shown, as the projections and also to employ an uneven number of such pins, relatively so arranged that when one end of the pivoted element 20$^b$ abuts upon the top of a pin 19$^b$ the opposite end of said element will unfailingly enter between the two other of said pins, thereby instantaneously establishing a positive driving contact between the members.

I prefer to mount the pivoted clutch elements 20$^b$ as parts of the driving members 20 and 23, respectively, and to mount the pins 19$^b$ so that one set thereof will rotate with the gear 19 and the other set thereof will rotate with the gear 24. In other words, I prefer that the pivoted elements 20$^b$ be carried by the driving members and the pins 19$^b$ be carried by the driven members of the clutches.

It is usual in transmission mechanisms for record controlled musical instruments to provide braking means having members operative with relation to the take up and rewind shaft, respectively and automatically operative to cause one of its members to exert a braking action with relation to the rewind shaft when the latter is running otherwise free; i. e. when the power is being applied to the take up shaft and its other member to exert a braking action with relation to the take up shaft when the power is being applied to the rewind shaft. Such means are embodied in this mechanism. As here shown, the braking members marked 25 and 26, operate upon members of the clutches, the member 25 on the body of the member 23 of one clutch and the brake 26 upon a sleeve which carries the pins 19$^b$ of the other clutch and is preferably formed as a part of the gear 19. The arms of these brakes are of spring nature to force them yieldingly toward the members on which they operate. The lever 22 has a lateral projection 27 to engage the member 26 and raise it out of engagement with its clutch member simultaneously with the movement thereto of the complementary clutch member 20. The member 25 is arranged in the path of movement of the clutch member 23 so as to be engaged therewith when said member is moved out of engagement with its complementary member and to be free from said member 23 when the latter is moved into engagement with said complementary clutch member. Of course, any other suitable braking means may be employed.

The rewinding shaft 4 is mounted for longitudinal movement and special means to accomplish such movement, operable under control of the record, is provided to maintain proper tracking relation between the perforations of the note sheet and the corresponding openings in the tracker bar. In order that longitudinal movement of the rewinding shaft may be instantaneously transmitted to the music roll there must be a positive connection longitudinally between the shaft and roll. On the other hand, it is very desirable that the connection be such that the music roll when put in place immediately takes its permanent position relative to the rewind shaft and the locking engagement therebetween will be made unfailingly operative when power is applied either to the rewind shaft or to the roll. In order that these desirable features may be incorporated in my transmission mechanism, I have specially constructed the rewind shaft and elements applied thereto, as follows:

The gear 9 is provided with a sleeve $9^b$ which forms a long hub extension and this hub extension is secured to the gear by the screw $9^a$ and to the shaft 4 by the screw $9^c$, whereby the shaft 4 and the gear 9 rotate together. The screw $9^c$ holds the shaft in a desired endwise position and permits it to be shifted in or out of the hub extension without interfering with the other elements. A shaft section $4^a$ extends through the hub of the gear 9 and into the hub extension $9^b$. It has a head at its outer end. A revoluble bearing 8 is mounted upon the shaft section $4^a$ in position to abut against the adjacent surface of the gear 9 and adjacent the end of the sleeve $9^b$. It is provided with a circumferential helical groove $8^a$ to receive the projecting end of a screw or other suitable element 10 (Fig. 1) which is carried by the frame. Arranged about the end of the extension $8^a$ of the bearing 8 is a lever 11. This lever 11 is securely held in place by its clamp construction as shown in Figure 2. In practice the lever is operated, preferably under control of the record, to move the shaft 4 and consequently the music in a corresponding endwise direction. In this particular construction, the bearing $8^a$ and lever 11 oscillate about the shaft section $4^a$, the latter being free to rotate with the shaft 4. When the lever 11 is oscillated, the shafts $4^a$ and 4 will be moved in an endwise direction because of the cooperation of the screw 10 and the groove $8^a$. Inasmuch as the bearing 8 engages the gear 9 and sleeve $9^b$ it will be understood that endwise movement of the bearing toward the left will be transmitted to said gear and sleeve and, through their connection with shaft 4, to the latter. The lateral or endwise movement of the elements which rotate while the note sheet is being fed from or back onto its music roll may take place during such rotative movements, i. e. the shaft 4 and the parts applied thereto may be shifted endwise while they are in motion rotatively.

Means forming elements of connections between the shafts 4 and 5 and the ends of the music roll and take up spool respectively are provided at the ends of the shafts adjacent said roll and spool. The illustrated means for this purpose at the ends of the shaft 5 is the aperture $5^a$. The means to connect the music roll to the shaft 4 comprises a member 13 and a sleeve 14 fastened to said shaft. The end of the sleeve is arranged to engage the surface of the adjacent flange commonly provided at the end of a music roll spool, and said sleeve is provided with a sliding member 15 having a key or tongue $15^a$ to be received by the groove or depression commonly formed in such spool flange. The music roll spool and its end flange are not herein shown because they are of ordinary and well known construction. The sliding key member 15, $15^a$ is resiliently mounted being here shown as pressed yieldably outward by a spring 16 so as to allow the member $15^a$ to be pressed inwardly with relation to the sleeve 14 until the depression or groove in the music roll spool aligns with the tongue and immediately when so aligned to spring outward relatively to the sleeve and roll to lock the roll to the shaft.

Having thus described the invention, what I believe to be new and desire to secure by Letters Patent is:

1. A transmission mechanism for record controlled musical instruments, comprising a take up shaft; a rewinding shaft; alternately operable means for applying positive driving power to said shafts, respectively, including a clutch mechanism having rotative and relatively slidable complementary members provided with co-acting locking elements, comprising spaced projections on one member and a pivoted element on the other member, said projections being correlated with each other and with the pivoted element to provide spaces for the respective ends of the pivoted element between confronting sides of the projections and to assure that there will always be a space in position to receive one end of the pivoted element and a projection to engage the other end of said element whenever the members are being brought together in position in which the pivoted element will not be in full alinement with spaces between confronting sides of the projections contiguous both ends of the pivoted element; and an actuating member to impart relative slidable movement to said clutch members.

2. A transmission mechanism for record controlled musical instruments, comprising a take up shaft, a rewinding shaft, means including a clutch mechanism to apply driving power positively to said shafts, alternately, and an actuating element for the clutch mechanism; said clutch mechanism including complementary relatively rotative and slidable members whose confronting faces are provided, respectively, with an uneven number of spaced fixed projections and with a swiveled element, said projections and swiveled element being relatively so positioned that during the relative movement of the clutch members toward each other one end of the swiveled element will be engaged by one of the projections and the other end of said element thereby forced at a greater speed than that of the member carrying it into a position to engage the side of another of said projections upon further relative movement of said members.

3. A transmission mechanism for record controlled musical instruments, comprising a take up shaft, a rewinding shaft, means including a clutch mechanism to apply driving power positively to said shafts, alternately, and an actuating element for the clutch mechanism; said clutch mechanism including complementary relatively rotative and slidable members the confronting portions of which are respectively provided with a swiveled element and with projections, coacting to lock the members together for unitary rotative movement, said swiveled element of one member extending diametrically with relation to the face of the complementary member and having relatively movable ends, and said projections on the latter member being arranged with relation to each other and to said ends of the swiveled member that one of the projections will engage an end of the swiveled element and cause the other end of said element to enter a space between projections, during relative movement of the clutch members.

4. A transmission mechanism for record controlled musical instruments comprising a drive shaft, a rewind shaft, a take up shaft, gearing between the drive shaft and the rewind shaft including a loose gear and a clutch having relatively slidable clutch members on the drive shaft to lock the loose gear to and free it from rotative engagement with said shaft, gearing between the drive shaft and the take up shaft, including a loose gear and a clutch having relatively slidable complementary members on the take up shaft, to lock said gear to and free it from rotative engagement with the latter, and means for operating the clutches to cause the complementary members of one to be brought into engaging relation with each other simultaneously with the freeing of the complementary member of the other from their engaging relation: each of said clutches having one of its members provided with a swiveled locking element and its other member provided with a series of fixed projections arranged with relation to each other and to the ends of the locking element to provide a projection in line with one end of the locking element and a space between projections in line with the other end of said element.

5. In a transmission mechanism for record controlled musical instruments, a rewind shaft mounted to be movable rotatably and longitudinally, means to impart rotative movement to the shaft and means to impart endwise movement thereto while it is rotating, said shaft having an end portion to abut against a music roll and locking means movable relatively to the abutting portions of the roll and shaft to cause them to revolve together.

6. In a transmission mechanism for record controlled musical instruments, a rewind shaft mounted to be movable rotatably and longitudinally, means to impart rotative movement to the shaft and means to impart endwise movement thereto while it is rotating, said shaft having at one end a sleeve to abut against the adjacent end of a music roll, a spring in said sleeve and a key or tongue yieldably pressed outward by the spring and operating to lock the music roll to the shaft.

7. In a transmission mechanism for record controlled musical instruments, a rewind shaft comprising two separated sections arranged end to end, one of said sections having means to connect it to a music roll and being mounted for rotative movement relatively to the other section and provided with means for rotating it, and said other section having means for turning it and when turned to impart endwise movement to the first named section.

8. In a transmission mechanism for record controlled musical instruments, a rewind shaft comprising a first and a second section formed separate from each other and arranged in an endwise relation, the first section having a yieldable key or tongue to lock it to the adjacent end of a music roll and being rotative relatively to the second section and provided with means for rotating it, and said second section having means for turning it and to impart endwise movement to the first section when it is turned by said means.

9. In a transmission mechanism for record controlled musical instruments, a rewind shaft mounted to be movable rotatably and laterally and having means to connect it to a music roll, means to impart rotative movement to the shaft and means to impart endwise movement thereto while it is rotating, the latter means including an oscillatory bearing member having a circumferential helical groove and a stationary member to engage the groove.

10. In a transmission mechanism for record controlled musical instruments, a frame having a fixed projection, a rewind shaft mounted to be movable rotatively and longitudinally, means to move it rotatively and means co-operating with said projection to move it longitudinally including a member having a helical groove to receive said projection, means to oscillate said member and means to transmit its endwise movement to the shaft.

11. In a transmission mechanism for record controlled musical instruments, a rewind shaft comprising a first and a second section formed separate from each other and arranged in an endwise relation, the first section having at one end means to lock it to the adjacent end of a music roll and mounted for endwise movement with the second section, a gear to impart rotative movement to the first section and mounted to rotate therewith and means to move the first section longitudinally comprising a bearing member journaled on the second section and provided with a helical circumferential groove and a projection to engage said groove and co-operate therewith to cause the bearing member to move endwise when turned.

12. In a transmission mechanism for record controlled musical instruments, a frame, transmission mechanism carried thereby, said frame having lateral hollow externally threaded bosses projecting from one of its sides and forming bearings for adjacent ends of the rewind and take up shafts, respectively, and flanged cup-nuts screwed upon said bosses and co-operating therewith to secure the frame and mechanism in place in the instrument.

13. A transmission unit for record controlled musical instruments, comprising a frame; transmission gearing operative to unroll and re-roll the music roll of the instrument, including a take up shaft, a rewind shaft and means to apply power to the shafts alternately, all mounted in said frame; hollow bosses projecting from a side of said frame and providing bearings for said shafts, respectively; means operatively engageable with said bosses and separable therefrom and co-operating therewith to secure the unit to a side of the spool box of the instruments, and means connected with said shafts to connect adjacent ends of the music roll and take up roll thereto.

14. A transmission unit for record controlled musical instruments, comprising a frame; transmission gearing operative to unroll and re-roll the music roll of the instrument, including a take up shaft, a rewind shaft and means to apply power to the shafts alternately, all mounted in said frame; hollow bosses projecting from a side of said frame and providing bearings for said shafts, respectively; means operatively engageable with said bosses and separable therefrom and co-operating therewith to secure the unit to a side of the spool box of the instruments, and means connected with said shafts to connect adjacent ends of the music roll and take up roll thereto, one of said means being spring-pressed outwardly relatively to its shaft and corresponding boss.

15. A transmission unit for record controlled musical instruments, comprising a frame having hollow bosses projecting from one of its sides to enter openings in a side of the spool box of the instrument; a rotative and endwise-movable rewind shaft and a take up shaft having ends borne by said bosses, respectively, and their opposite ends mounted in bearings in the side of the frame opposite the bosses; means to apply power to said shafts alternatively and means under control of the music roll to move the rewind shaft longitudinally all supported by said frame; means operatively engageable with said bosses and separable therefrom and co-operating therewith to secure the unit to the spool box; said shafts having within the spool box to connect the adjacent ends of the music roll and take up roll to the shafts, respectively.

Signed at New York city, N. Y. this 19th day of April, in the year one thousand nine hundred and twenty-one.

CHARLES UEBELMESSER.